United States Patent [19]

Balsa

[11] Patent Number: 4,629,922
[45] Date of Patent: Dec. 16, 1986

[54] GAS RECIRCULATOR FOR ACYCLIC MACHINES

[75] Inventor: Thomas F. Balsa, Tucson, Ariz.

[73] Assignee: The United States of America as represented by the Secretary of the Navy, Washington, D.C.

[21] Appl. No.: 737,753

[22] Filed: May 28, 1985

[51] Int. Cl.[4] ............................................. H02K 13/00
[52] U.S. Cl. ..................................... 310/178; 310/219
[58] Field of Search .................................. 310/219, 178

[56] References Cited

U.S. PATENT DOCUMENTS 2,588,466  3/1952  Barnes .................................. 310/178
2,828,431  3/1958  Klaudy ............................ 310/219 X
4,027,183  5/1977  Hatch .................................. 310/219

Primary Examiner—Donovan F. Duggan
Attorney, Agent, or Firm—Robert F. Beers; Henry Hansen

[57] ABSTRACT

A cover gas recirculator in an acyclic generator having liquid metal collectors for reducing entrainment of the liquid metal in the gas. Radial passages in the stator housing provide natural recirculating paths for the cover gas to flow radially outward along the sides of the rotor and return inwardly through the passages. Scoops or lips located inward of the liquid metal collector divert the outward gas flow into the passages to minimize contact of the gas with the liquid metal.

6 Claims, 4 Drawing Figures

GAS RECIRCULATOR FOR ACYCLIC MACHINES

STATEMENT OF GOVERNMENT INTEREST

The invention described herein may be manufactured and used by or for the Government of the United States of America for governmental purposes without the payement of any royalties thereon or therefor.

BACKGROUND OF THE INVENTION

The present invention relates to acyclic machines of the type using liquid metal collectors, and more particularly to an improvement for retaining the liquid metal in such machines.

Radial type acyclic motors and generators generally include a metallic disk rotor rotating on a shaft between electromagnetic stator poles excited by field coils wound concentric with the shaft. Instead of solid brush, current collectors at the rotor periphery, liquid metal collectors are sometimes used to close the electrical current loop between the shaft and the rotor, and an inert pressurized cover gas fills the gaps between the rotating components and the stationary housing. Ideally, the liquid metal is confined to the outermost area of the rotor, however, the gaps on the sides being quite small—on the order of 50 mils—the motion, particularly at high speeds, induces a recirculating radial flow of the gas along the housing. Some of the liquid metal becomes entrained in the inwardly flowing gas and may leak out of the machine. The depletion of liquid metal eventually causes an electrical discontinuity in the current loop at the collector. Various methods for recovering or confining the liquid metal have been used such as mechanical seals, stepped rotor and housing geometries or so called "rain gutters". U.S. Pat. No. 4,106,616 to Burton D. Hatch for example centrifically separates the entrained liquid metal from the cover gas by allowing the mixture to flow into a central chamber or gutter within the rotor from which it can return to the collector within the rotor. However, these devices generally decrease the electromechanical performance of the machine.

SUMMARY OF THE INVENTION

Accordingly, it is an object of the present invention to provide an acyclic machine having liquid metal collectors in which entrainment of the liquid metal in the recirculating cover gas is eliminated or substantially reduced particularly during high speed operation. Another object is to provide gas paths in acyclic machines having liquid metal collectors which insure long term electrical continuity of the liquid metal with the rotor. A further object is to provide gas recirculating radial paths in an acyclic machine having liquid metal collectors which are isolated from the liquid metal. Still another object is to provide recirculating paths for gas in an acyclic machine which are simple, reliable, and easy to manufacture and maintain.

Briefly, these and other objects of the invention are accomplished by radial passages in the stator housing of a disk-type acyclic machine parallel to the gaps between sides of the rotor and housing thereby providing natural recirculating paths for the gas to flow radially outward in the gaps to regions short of the liquid metal collector and then inward through the passages returning to the gaps in regions near the rotor shaft. Lips in the outward regions extending into the gaps isolate the gas flow from the liquid metal.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
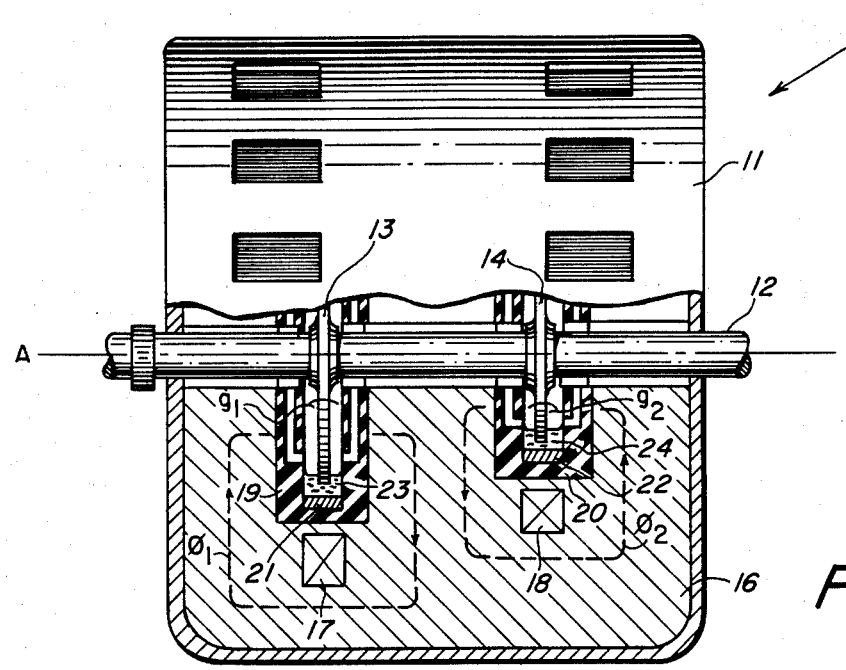
FIG. 1 is a schematic representation partially in cross section of a dual-rotor acyclic generator having liquid metal collectors according to the invention.

Referring now to the drawings wherein like characters designate like or corresponding parts throughout the several views, FIG. 1 shows a disk-type acyclic generator 10 with a housing 11 and a shaft 12 rotatable about an axis A—A. A pair of rotor disks 13 and 14 spaced along the axis are coaxially fixed to shaft 12 for rotation therewith. A stator core 16 and concentric field coils 17 and 18 in housing 11 encircle each rotor disk 13 and 14 and provide two flux loops $\phi_1$ and $\phi_2$ through the respective rotor disks 13 and 14. The core 16 is lined adjacent to the disks with insulators each containing a solid collector ring, such as copper, radially spaced from the periphery of disks 13 and 14, respectively. Liquid metal 23 and 24 such as NaK, $NaK_{-7}$ or Hg, is employed around the collector sites for electrical continuity with the disks 13 and 14. At high speeds the liquid metal is retained in 360° contact by centrifical force induced by the disks 13 and 14. At zero and low rotor speeds, other conventional techniques are employed for retaining contact such as disclosed in U.S. Pat. No. 4,027,184 to James D. Hurley. Pressurized cover gas, such as NaK or Hg, is supplied to the gaps $g_1$ and $g_2$ formed between the rotating and stationary elements.

Figure 2:
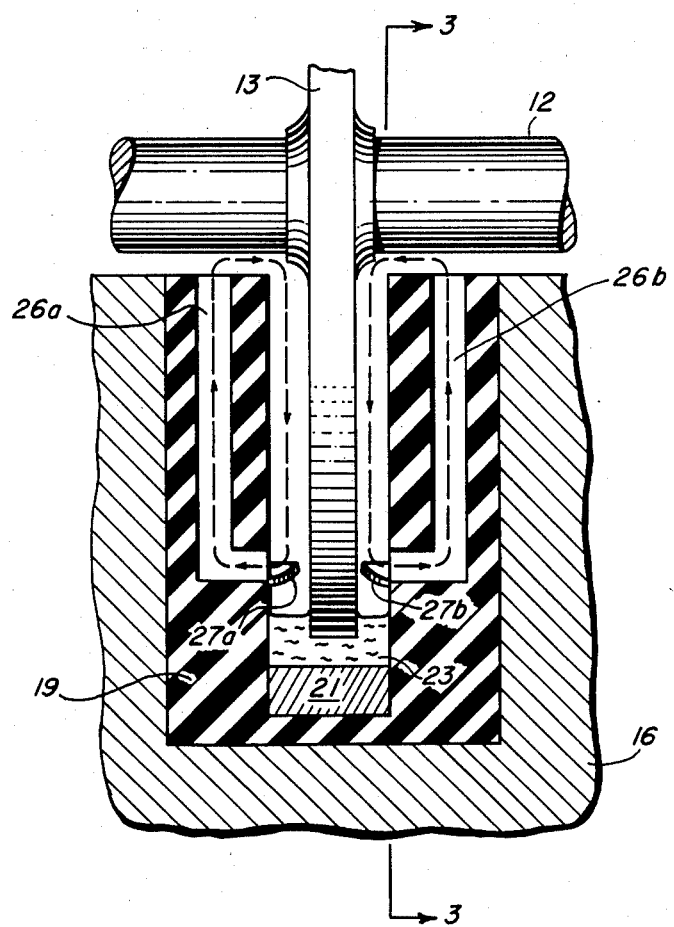
FIG. 2 is an enlarged fragmentary view, about one of the rotors of FIG. 1 showing the gas recirculating paths
Figure 3:
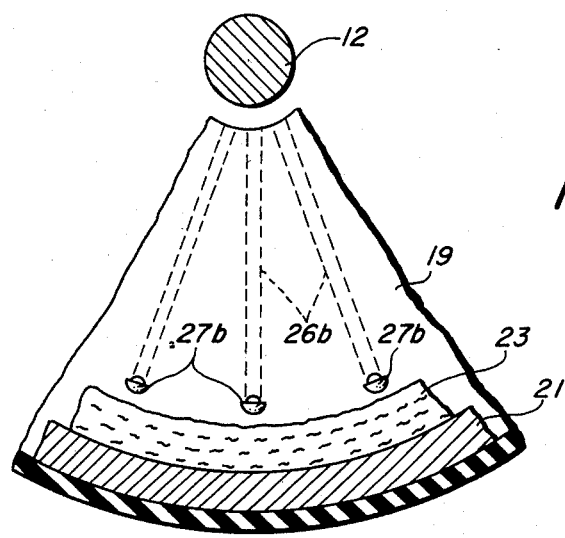
FIG. 3 is a cross sectional view of the housing taken along the line 3—3 of FIG. 2.

The recirculating gas paths at rotor disk 13 are shown in more detail in FIGS. 2 and 3, the paths being the same at disk 14. Insulator liner 19 includes a plurality of equally spaced radial ducts 26a and 26b on each side of disk 13 communicating between the gaps $g_1$ adjacent to the surface of the liquid metal 23 and rotor 12. Hemispherical scoops or lips 27a and 27b around the outer radial edge of ducts 26a and 26b extend into gaps $g_1$ to isolate the gas flow from the liquid metal 23.

In operation, both sides of disk 13 will drag the surrounding gas in the gap $g_1$ radially outward to lips 27a and 27b where it is diverted, before reaching the liquid metal 23, into ducts 26a and 26b and circulated radially inward toward the rotor 12. Hence, there is little, if any, entrainment of liquid metal particles in any gas which may escape from the generator.

The cross-sectional area of ducts 26a and 26b should be fairly large to offer as little resistance as possible to the gas flow and to reduce the likelihood of the liquid metal plugging the passageways. Therefore as many ducts as possible are contemplated while retaining structural integrity.

Figure 4:
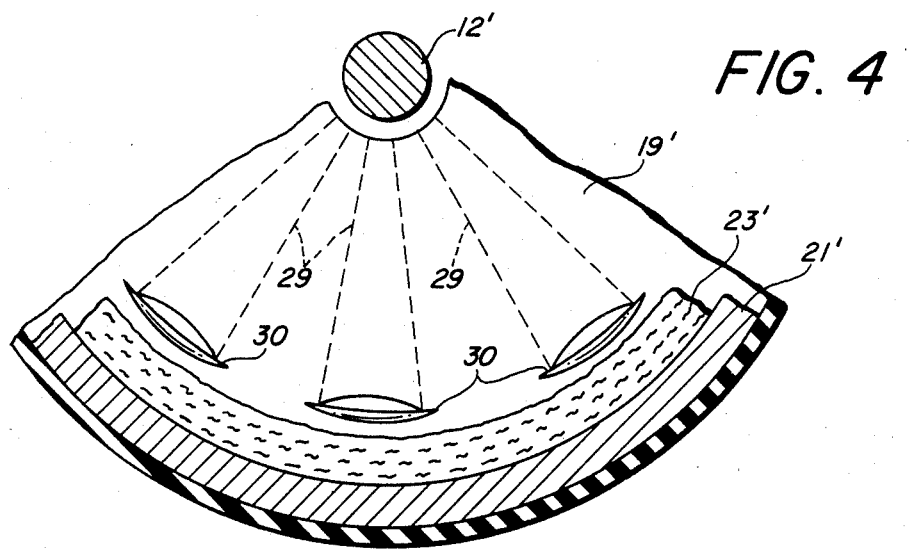
FIG. 4 represents a view like in FIG. 3 of an alternate embodiment according to the invention.

The alternate embodiment shown in FIG. 4 comprises pie-shaped ducts 29 in insulator eminating from the gap near rotor 12' in increasing cross-sectional area.

Scoops or lips 30, like lips 27b, isolate the gas flow from the liquid metal 23' at the outer region of the rotor disk.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A gas recirculator for an acyclic machine including a stator, rotor, liquid metal collector contiguously encircling the periphery of the rotor, and cover gas filling the interstices therebetween, comprising: an insulator liner secured to the stator and encircling the collector, said liner having bifurcated sides extending radially inward forming gaps on either side of the rotor for receiving the gas, and a radial passage formed in each of said sides communicating with respective ones of the gaps at regions of the gas adjacent to the axis of the rotor and adjacent to the collector; and means secured to the sides of said insulator adjacent to the collector and extending into each of said gaps for diverting the radially outward flow of gas into said passages.

2. A gas recirculator according to claim 1 wherein each of said passages comprises a plurality of equally spaced channel of uniform cross section along the length thereof.

3. A gas recirculator according to claim 1 wherein each of said passages comprises a plurality of equally spaced channels of uniformly increasing cross section with increasing radius.

4. A gas recirculator for an acyclic machine including a stator, rotor, liquid metal collector contiguously encircling the periphery of the rotor, and cover gas filling the interstices therebetween, comprising:

an insulator liner secured to the stator and encircling the collector, said liner extending radially inward forming a gap on the side of the rotor for receiving the gas, and a passage formed therein communicating with said gap at regions of the gas adjacent to the axis of said rotor and adjacent to the collector; and diverting means secured to the side of said insulator adjacent to the collector and extending into said gap for diverting the radially outward flow of the gas into said passage.

5. A gas recirculator according to claim 4 wherein said passage includes: a plurality of equally spaced channels of uniform cross section along the length thereof.

6. A gas recirculator according to claim 4 wherein said passage comprises a plurality of equally spaced channels of uniformly increasing cross section with increasing radius.

* * * * *